(12) United States Patent
Glebe

(10) Patent No.: US 8,442,595 B2
(45) Date of Patent: May 14, 2013

(54) ADAPTIVE RING SIGNAL LEVEL DEVICE AND METHOD

(75) Inventor: Dag Glebe, Sodra Sandby (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 48 days.

(21) Appl. No.: 13/283,860

(22) Filed: Oct. 28, 2011

(65) Prior Publication Data
US 2012/0165068 A1 Jun. 28, 2012

Related U.S. Application Data

(60) Provisional application No. 61/429,527, filed on Jan. 4, 2011.

(30) Foreign Application Priority Data

Dec. 23, 2010 (EP) .................................... 10196746

(51) Int. Cl.
*H04M 1/00* (2006.01)
*H04K 3/00* (2006.01)

(52) U.S. Cl.
USPC ........................... 455/567; 381/104; 381/107

(58) Field of Classification Search .................. 455/567; 381/104, 107
See application file for complete search history.

(56) References Cited

U.S. PATENT DOCUMENTS

6,044,279 A * 3/2000 Hokao et al. .................. 455/567
2010/0016014 A1   1/2010 White

FOREIGN PATENT DOCUMENTS

EP    1047258 A2   10/2000
WO    9905850 A1    2/1999
WO    2010015426 A1 2/2010

OTHER PUBLICATIONS

Extended European Search Report, corresponding to Application No. EP 10 19 6746, completed on Jun. 7, 2011.

* cited by examiner

*Primary Examiner* — Lee Nguyen
(74) *Attorney, Agent, or Firm* — Renner, Otto, Boisselle & Sklar, LLP

(57) ABSTRACT

The present invention relates a method and a mobile communication device for generating an adaptive ring signal level in the mobile communication device in response to the surrounding environmental condition of said mobile communication device and also in response to the way the mobile communication device is stored away. By comparing a transfer that is determined based on the relation between an emitted signal from the loudspeaker and a response recorded by the microphone and an ideal transfer function a calculated response function is obtained. The calculated response function is compared with predefined response functions stored in a look up table to find a match that is then selected. The ring signal is thereafter adjusted to a level that corresponds to the values associated with and stored together with the selected predefined response function.

12 Claims, 2 Drawing Sheets

ADAPTIVE RING SIGNAL LEVEL DEVICE AND METHOD

CROSS-REFERENCE TO RELATED APPLICATION

This application claims the benefit of U.S. Provisional Patent Application Ser. No. 61/429,527, filed Jan. 4, 2011, the entire disclosure of which is hereby incorporated by reference.

TECHNICAL FIELD

The present invention relates to a method and device for generating a ring signal in a mobile communication device and especially an adaptive ring signal level.

BACKGROUND

Communication devices, such as cellular telephones, have become increasingly versatile and are not longer used only for making and receiving phone calls. The applications of today include for example applications that allow users to do as send/receive text messages, play games, watch TV, play music, take pictures, etc. As a result, cellular telephones are part of every day life and are therefore carried around by the user in some convenient way. Usually it is carried in a pocket, in a special case attached to a belt or similar, in a handbag, a backpack or the like.

Since the cellular phone is carried around it is also often exposed to noisy environments. This might cause a problem when the cellular phone is ringing or activated in some other way. It may be difficult for a user to perceive such a signal on time in order to respond to it due to the background noise.

Most cellular phones therefore include some mechanisms for adjusting the volume of the ring signal in response to the noise of the surrounding environment. One way is to provide the cellular phone with a user interface that defines different user profiles, which each define the type of ring signal to be used depending on the situation the user is in, such as a loud ring signal, a vibrating signal etc. Such user profile may be set manually by the user, for example putting the cellular phone in vibrating mode when selecting the profile "meeting".

One other solution to this problem could of course be to constantly keep the ring signal at a high level. However, loud ring volumes may cause hearing damages and also tend to be very disturbing in quiet environments. Maximum allowed ring signals are therefore regulated by cellular phone standards.

Another way to adapt the ring signal is to first check the input level of the microphone, i.e. high for a noisy environment and low for a quiet environment, and adapting the ring signal level in response thereto.

However, this method does not work very well when the device is carried in a pocket, bag or the like since the noise picked up by the microphone may by damped by the surrounding in which the cellular phone is kept, which makes the emitted ring signal softer. What makes this situation even more problematic is that the same muffling effect that damps the surrounding noise also will dampen the already soft ring signal even more. This will result in a risk that the user completely misses the call.

SUMMARY

Thus, there is an apparent need for adapting the ring signal level in a mobile communication device, taking to account not only the noise of the surrounding environment, but also the circumstances under which the mobile communication device is stored and to do so without any user involvement. This may be achieved by comparing a pulse response recorded by the microphone with predefined pulse responses stored in a look up table.

According to a first aspect of the invention a method is provided for generating an adaptive ring signal level in a mobile communication device in response to the surrounding environmental condition of said mobile communication device. The method comprises the steps of emitting a reference pulse signal from a loudspeaker, recording a pulse response of said emitted signal at a microphone and storing it in a memory means. A transfer function is determined based on the relation between the emitted signal and the recorded response and then compared with an ideal transfer function stored in the memory means. The ideal transfer function has been obtained under controlled and predetermined conditions. The difference between the determined transfer function and the ideal transfer function is calculated and stored in the memory means as a response function. The calculated response function is compared with predefined response functions stored in a look up table and the predefined response function that has the closest match with the calculated response function is selected. The ring signal is thereafter adjusted to a level that corresponds to the values associated with and stored together with the selected predefined response function. Thus, according to an embodiment of the invention, the ring signal level may be adapted to the environmental boundary condition (e.g., as defined by a bag, a pocket, open air etc.) of the mobile communication device, so that the ring signal level may be adapted to the environmental noise of the device in combination with the way the device is stored away.

In a preferred embodiment, in which the mobile communication device is also provided with a camera or light sensor, the method further comprise the steps of collecting information about the ambient light conditions with the camera or a light sensor and using the, and comparing the calculated response function first with the predefined response functions having the same light conditions as the collected information.

In another preferred embodiment the emitted reference pulse signal is emitted periodically during the time when the mobile communication device is waiting for receiving a call and continuously during the time when the ring signal is ringing and the incoming call has not yet been answered.

In yet another preferred embodiment the emitted reference pulse signal is the ring signal itself.

According to a second aspect of the present invention there is provided a mobile communication device capable of generating an adaptive ring signal level in response to the surrounding environmental condition, comprising a loudspeaker, a microphone, processing logic and memory means, where the processing logic of the mobile communication device is configured to execute the steps performed according to the first aspect and the different embodiments thereof.

According to a third aspect of the present invention a computer program comprising code means is accomplished for performing the steps of the method of the present invention when the program is run on a processing logic.

According to a fourth aspect of the present invention a computer program product comprising program code means stored on a computer readable medium is accomplished for performing the method of the present invention, when said product is run on a processing logic.

BRIEF DESCRIPTION OF THE DRAWINGS

The present invention will now be described in closer detail with reference to the accompanying drawings, which are incorporated in and constitute a part of this specification, in which.

DETAILED DESCRIPTION

A mobile communication device according to the present invention will now be described in relation to a cellular telephone, which is a preferred variation of the invention. However, an adaptive ring signal level may also be implemented in other mobile communication devices making use of a ring signal or alert signal such as a cordless telephone, a PDA, a lap top computer, a media player, such as MP3 player or the like or any other type of portable device having a microphone and means for outputting a ring or alert signal.

Figure 1:
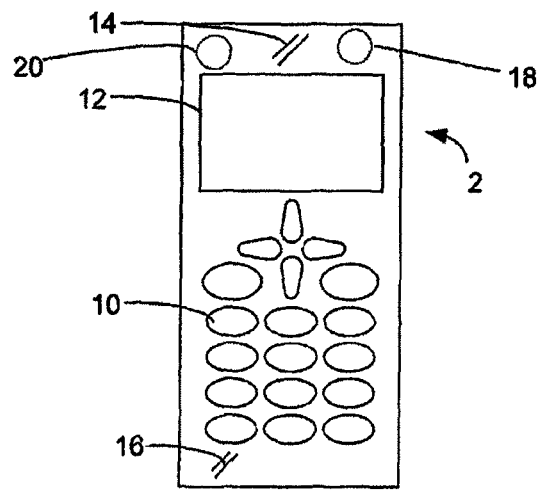
FIG. 1 is a front view of a cellular phone in connection with which the present invention may be used.

FIG. 1 show an exemplary mobile communication device 2, in which the method for generating an adaptive ring signal level according to the present invention may be implemented. As shown the mobile communication device 2 may include control buttons or keys 10, a display 12, a loudspeaker 14, a microphone 16, a camera 18 and a sensor 20.

It should be understood that the mobile communication device 2 is surrounded by a housing, not specially denoted in FIG. 1, which may protect the mobile communication device 2 from wear and outside elements. The housing is designed to hold various elements of the mobile communication device 2, such as the display 12, the camera 18 and the sensor 20 etc as is well known by a person skilled in the art.

Also the speaker 14 and the microphone 16 are well known elements of a mobile communication device 2 and are therefore, as such, not discussed any further. When it comes to the display 12 it may be an ordinary display or a touch sensitive display. The control buttons or keys 10 may then be omitted if the display is a touch sensitive display, which is configured to show virtual keys or control buttons. Of course, as is realized by a skilled person a combination of hardware keys and virtual keys may also be used.

Figure 2:
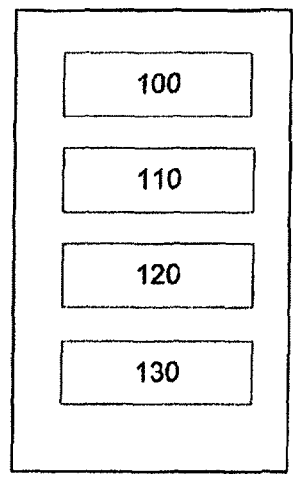
FIG. 2 is a block diagram of a cellular phone in accordance with the present invention.

FIG. 2 shows a block diagram of components usually present in a mobile communication device 2. A mobile communication device may include input means 100, output means 110, processing logic 120 and memory means 130. The mobile communication device may be configured in a number of different ways and include other or different elements as is well known by a person in the art, such as modulators, demodulators, encoders, decoders etc. for processing data.

The input means 100 may include all mechanisms that a user uses in order to input information into the mobile communication device, such as a microphone 16, a touch sensitive display 12 and keys 10 etc. Also the camera 18 and the sensor 20 may be defined as input means 100.

Output means 110 may include all devices that output information from the mobile communication device including the display 12, the loudspeaker 14 etc. The processing logic 120 may include one or more processors, microprocessors, application specific integrated circuits or the like. The processing logic 120 may execute software instructions/programs or data structures in order to control the operation of the mobile communication device 2. The memory means 130 may be implemented as a dynamic storage device, a static storage device, a flash memory etc. The memory means 130 may be used to store information and/or instructions for execution by the processing logic 120, temporary variables or intermediate information during execution of instructions by the processing logic 120 etc.

Figure 3:
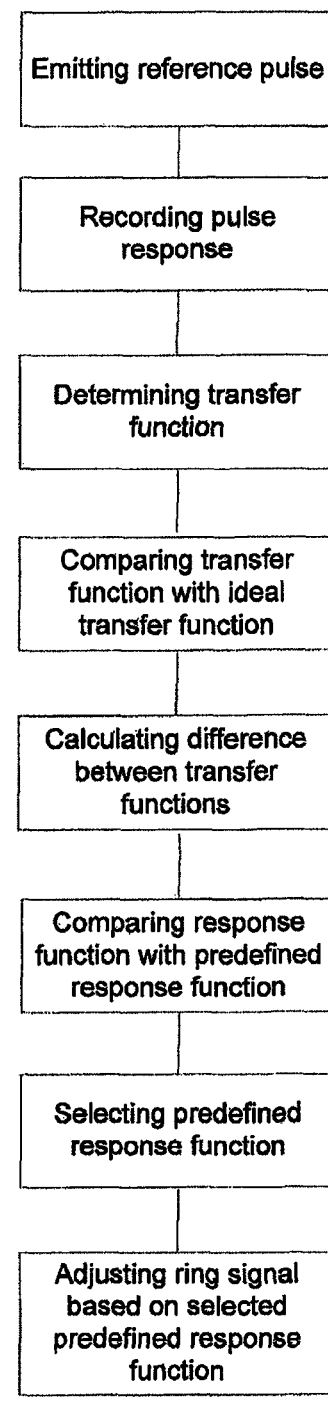
FIG. 3 is a flow chart showing the method for adapting the ring signal level in accordance with the present invention.

In the following the method according to the present invention, as depicted in FIG. 3, will be described in an exemplary way with reference to a cellular phone.

When there is a lot of background noise it can be difficult to hear the ring signal from the cellular phone. In an ordinary cellular phone with an adaptive ring signal level the output level is normally adjusted depending on the surrounding noise level. Hence, if the surrounding noise is high the ring signal level will also be high and in a silent environment the ring signal level will be adapted to a low ring signal level. This state of the art approach will work fine as long as the cellular phone is not stored away in a pocket, handbag or the like, which is often the case. In such a case the noise inputted to the microphone 16 will be quite low due to the damping effect of the material, often textile, fabric etc., surrounding the cellular phone. Therefore the output ring signal level will be low when it is stowed away, even if it actually should be high since most of the ring signal is likely to be absorbed by the surrounding material.

One way to overcome this problem according to the present invention is to use a transfer function that is determined based on the relation between a reference pulse signal emitted from a loudspeaker 14 and a pulse response of said emitted signal recorded at a microphone 16. When such a transfer function has been determined it is stored in a memory means 130. In the memory means there is also stored an ideal transfer function that has been obtained under controlled and predetermined conditions. Such conditions may preferably prevail in a silent anechoic room. The reference pulse signal may be any signal sent out by the loudspeaker 14. It may be sent out periodically during times when the cellular phone is waiting for receiving a call, or it may be triggered by an incoming call and thereafter continuously sent out as long as the ring signal is ringing and the incoming call has not yet been answered. However, as is readily understood by a person skilled in the art there are many variations in how and when the reference pulse signal is sent out. It is also possible that the reference pulse signal is generated by some other device than the loudspeaker 14, even it is preferred to use the loudspeaker 14 already present since it will kept down the total amounts of components used in the mobile communication device. In a preferred embodiment of the present invention the reference pulse signal is the ring signal itself.

The transfer function may also be seen as the correlation between the signal outputted by the loudspeaker 14 and the signal inputted to the microphone 16. When the cellular phone is lying on a flat surface in a quiet room, i.e. the ideal case, the correlation between the loudspeaker 14 and the microphone 16 is very good. This correlation may also be used for echo cancellation as is known to the person skilled in the art. However, when the cellular phone is carried in a bag, a pocket or the like the correlation will be weak since the loudspeaker 14 and/or the microphone 16 are likely to be blocked or damped.

When the transfer function has been recorded and stored it will be compared to the ideal transfer function which as mentioned above also is stored in the memory means 130. The difference between the determined transfer function and the ideal transfer function will be calculated and stored in the memory means 130 as a response function. This response function may be seen as a map or picture of the prevailing conditions, which the cellular phone is subjected for, i.e. the surrounding noise level and also in which way the cellular phone is stowed away.

In other words it may be expressed such that the part of the transfer function that is correlated with the ideal transfer function corresponds to an ideal case and the part that is uncorrelated contains information about the environment, i.e. the background noise of the cellular phone. Such information may be used for controlling different functionalities of the cellular phone such as speaker volume during an ongoing call.

The response function is compared with predefined response functions that are stored in a look up table of the memory means 130. These predefined response functions all describe different scenarios which the cellular phone may be subjected to. The comparison is based on finding and selecting the predefined response function that has the closest match with the calculated response function. Each predefined response function is stored together values that may be used for controlling the ring signal level. Thus, if the matching predefined response function corresponds to a case with high environmental noise and the cellular phone is stowed away in a pocket the values stored together with this predefined response function will adjust the ring signal to a high level such that the user of the cellular phone will be able to hear the ring signal.

As is readily understood by the person skilled in the art there may be many predefined response functions each defining a unique situations and corresponding output values used to adapt the ring signal level.

In order to speed up the matching process defined above it might be useful to collect information about the ambient light conditions. This may for example be made by the camera 18 or by the light sensor 20. If the ambient light conditions are dark it is likely that cellular phone is in a pocket or bag. Thus, in the matching process the predefined response functions that are related to a cellular phone that is stowed away will first be search. It will of course be the other way around if the detected ambient light conditions are light. Thus by comparing the calculated response function first with the predefined response functions having the same light conditions as the collected information it will be possible to speed up the matching process.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for generating an adaptive ring signal level in a mobile communication device in response to a surrounding environmental condition of said mobile communication device, the method comprising the steps of, emitting a reference pulse signal from a loudspeaker, recording a pulse response of said emitted signal at a microphone and storing it in a memory means determining a transfer function based on the relation between the emitted signal and the recorded response, comparing said transfer function with an ideal transfer function, stored in the memory means and which has been obtained under controlled and predetermined conditions, calculating the difference between the determined transfer function and the ideal transfer function and storing it in the memory means as a response function, comparing the calculated response function with predefined response functions stored in a look up table, selecting the predefined response function that has the closest match with the calculated response function, and adjusting the ring signal to a level that corresponds to the values associated with and stored together with the selected predefined response function.

2. The method according to claim 1, wherein the mobile communication device comprises a camera and the method further comprises the steps of, collecting information about the ambient light conditions with the camera, and comparing the calculated response function first with the predefined response functions having the same light conditions as the collected information.

3. The method according to claim 1, wherein the mobile communication device comprises a light sensor and the method further comprises the steps of, collecting information about the ambient light conditions with the light sensor, and comparing the calculated response function first with the predefined response functions having the same light conditions as the collected information.

4. The method according to claim 1, wherein the emitted reference pulse signal is emitted periodically during the time when the mobile communication device is waiting for receiving a call and continuously during the time when the ring signal is ringing and the incoming call has not yet been answered.

5. The method according to claim 1, wherein the emitted reference pulse signal is the ring signal itself.

6. A computer program comprising code means for performing the steps of claim 1, when the program is run on a processing logic.

7. A computer program product comprising program code means stored on a computer readable medium for performing the method of claim 1, when said product is run on a processing logic.

8. A mobile communication device capable of generating an adaptive ring signal level in response to the surrounding environmental condition, comprising a loudspeaker, a microphone, processing logic and memory means, where the processing logic of the mobile communication device is configured to execute the following steps, emitting a reference pulse signal from the loudspeaker, recording a pulse response of said emitted signal at the microphone and storing it in the memory means determining a transfer function based on the relation between the emitted signal and the recorded response, comparing said transfer function with an ideal transfer function, stored in the memory means and which has been obtained under controlled and predetermined conditions, calculating the difference between the determined transfer function and the ideal transfer function and storing it in the memory means as a response function, comparing the calculated response function with predefined response functions stored in a look up table, selecting the predefined response function that has the closest match with the calculated response function, and adjusting the ring signal to a level that corresponds to the values associated with and stored together with the selected predefined response function.

9. The mobile communication device according to claim 8, wherein the mobile communication device furthermore comprises a camera and the processing logic is configured to carry out the further steps of, collecting information about the ambient light conditions with the camera, and comparing the calculated response function first with the predefined response functions having the same light conditions as the collected information.

10. The mobile communication device according to claim 8, wherein the mobile communication device furthermore comprises a light sensor and the processing logic is configured to carry out the further steps of, collecting information about the ambient light conditions with the camera, and comparing the calculated response function first with the predefined response functions having the same light conditions as the collected information.

11. The mobile communication device according to claim 8, wherein the mobile communication device is configured to emit the reference pulse signal periodically during the time when the mobile communication device is waiting for receiving a call and continuously during the time when the ring signal is ringing and the incoming call has not yet been answered.

12. The mobile communication device according to claim 8, wherein the emitted reference pulse signal is the ring signal itself.

* * * * *